(12) United States Patent
Nagata et al.

(10) Patent No.: US 9,395,710 B2
(45) Date of Patent: Jul. 19, 2016

(54) MACHINE CONTROL PROGRAM GENERATION DEVICE, MACHINE CONTROL PROGRAM GENERATION METHOD, AND INFORMATION STORAGE MEDIUM

(71) Applicant: KABUSHIKI KAISHA YASKAWA DENKI, Kitakyushu-shi (JP)

(72) Inventors: Takeshi Nagata, Kitakyushu (JP); Kenichi Hirose, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 412 days.

(21) Appl. No.: 13/920,995

(22) Filed: Jun. 18, 2013

(65) Prior Publication Data

US 2013/0338797 A1 Dec. 19, 2013

(30) Foreign Application Priority Data

Jun. 18, 2012 (JP) ................. 2012-137369

(51) Int. Cl.
G05B 15/02 (2006.01)
G05B 19/042 (2006.01)

(52) U.S. Cl.
CPC ............ *G05B 15/02* (2013.01); *G05B 19/0426* (2013.01)

(58) Field of Classification Search
CPC ..................... G05B 15/02; G05B 19/0426
See application file for complete search history.

(56) References Cited

U.S. PATENT DOCUMENTS

| 6,336,151 B1* | 1/2002 | Seki | ............... G06F 9/4411 709/217 |
| 6,609,152 B1* | 8/2003 | Ono | ............... H04L 29/12009 709/222 |

(Continued)

FOREIGN PATENT DOCUMENTS

| JP | 05-173610 | 7/1993 |
| JP | 2000-181514 | 6/2000 |

(Continued)

OTHER PUBLICATIONS

Japanese Office Action for corresponding JP Application No. 2012-137369, Apr. 15, 2014.

(Continued)

*Primary Examiner* — M. N. Von Buhr
(74) *Attorney, Agent, or Firm* — Mori & Ward, LLP (57) ABSTRACT

Provided is a machine control program generation device for generating a machine control program to be executed on a controller for controlling a machine component, including: a connected device selector for selecting a connected device to be connected to the controller; and a connector identifier assignor for assigning, when the connected device selector selects the connected device, a new connector identifier for identifying a connector for connecting the controller and the selected connected device to each other to the selected connected device.

8 Claims, 8 Drawing Sheets

(56) References Cited

U.S. PATENT DOCUMENTS

| | | | | |
|---|---|---|---|---|
| 8,019,837 | B2* | 9/2011 | Kannan | H04L 29/12216 370/328 |
| 8,401,024 | B2* | 3/2013 | Christensen | H04L 12/2856 370/395.53 |
| 9,026,625 | B2* | 5/2015 | Christopher | H04L 61/6022 709/220 |
| 2004/0203874 | A1* | 10/2004 | Brandt | G05B 19/4183 455/456.1 |
| 2005/0283549 | A1* | 12/2005 | Gibson | G06F 13/385 710/62 |
| 2009/0164694 | A1* | 6/2009 | Talayco | G06F 13/4022 710/316 |
| 2009/0327462 | A1* | 12/2009 | Adams | G06F 9/5077 709/222 |
| 2011/0208880 | A1* | 8/2011 | Zhang | G06F 3/023 710/14 |
| 2012/0066356 | A1* | 3/2012 | Nguyen | H04L 61/2038 709/220 |
| 2013/0159582 | A1* | 6/2013 | Tongen | G06F 13/00 710/300 |
| 2013/0268695 | A1* | 10/2013 | Toda | G06F 13/10 710/8 |

FOREIGN PATENT DOCUMENTS

| | | | | |
|---|---|---|---|---|
| JP | 2000-242313 | | 9/2000 | |
| JP | 2000-259216 | | 9/2000 | |
| JP | 2003-228403 | | 8/2003 | |
| JP | 2011-065436 | | 3/2011 | |
| KR | WO 2006091042 A1 * | | 8/2006 | H04L 12/2803 |

OTHER PUBLICATIONS

Chinese Office Action for corresponding CN Application No. 201310239037.5, Jun. 3, 2015.

Japanese Office Action for corresponding JP Application No. 2012-137369, Oct. 28, 2014.

* cited by examiner

MACHINE CONTROL PROGRAM GENERATION DEVICE, MACHINE CONTROL PROGRAM GENERATION METHOD, AND INFORMATION STORAGE MEDIUM

CROSS-REFERENCE TO RELATED APPLICATION

The present disclosure contains subject matter related to that disclosed in Japanese Priority Patent Application JP 2012-137369 filed in the Japan Patent Office on Jun. 18, 2012, the entire contents of which are hereby incorporated by reference.

BACKGROUND OF THE INVENTION

1. Field of the Invention

The present invention relates to a machine control program generation device, a machine control program generation method, and an information storage medium.

2. Description of the Related Art

JP 2003-228403 A describes a configuration for editing a time chart for input devices and output devices by using a personal computer, compiling time chart data into a machine language, and transmitting the compiled machine language to a processing device via an interface.

Moreover, JP 2000-181514 A describes an input/output device number assignment method for a sequence program for a programmable controller. When divided sequence programs are generated by using peripheral devices, an individual unit label is set to an input/output unit while a device label is set to each of input/output devices of each of the input/output units in a virtual device configuration. Then, an input/output device number adapted to an actual device configuration is automatically assigned when the plurality of sequence programs are combined.

SUMMARY OF THE INVENTION

According to one embodiment of the present invention, there is provided a machine control program generation device for generating a machine control program to be executed on a controller for controlling a machine component, characterized by including: a connected device selector for selecting a connected device to be connected to the controller; and a connector identifier assignor for assigning, when the connected device selector selects the connected device, a new connector identifier for identifying a connector for connecting the controller and the selected connected device to each other to the selected connected device.

According to one embodiment of the present invention, there is provided a machine control program generation method for generating a machine control program to be executed on a controller for controlling a machine component, characterized by including: selecting a connected device to be connected to the controller; and assigning, when the connected device is selected, a new connector identifier for identifying a connector for connecting the controller and the selected connected device to each other to the selected connected device.

According to one embodiment of the present invention, there is provided a tangible computer-readable information storage medium having stored thereon a program for causing a computer to function as a machine control program generation device for generating a machine control program to be executed on a controller for controlling a machine component, the machine control program generation device including: a connected device selector for selecting a connected device to be connected to the controller; and a connector identifier assignor for assigning, when the connected device selector selects the connected device, a new connector identifier for identifying a connector for connecting the controller and the selected connected device to each other to the selected connected device.

DESCRIPTION OF THE EMBODIMENTS

A detailed description is now given of an embodiment of the present invention referring to the accompanying drawings.

Figure 1:
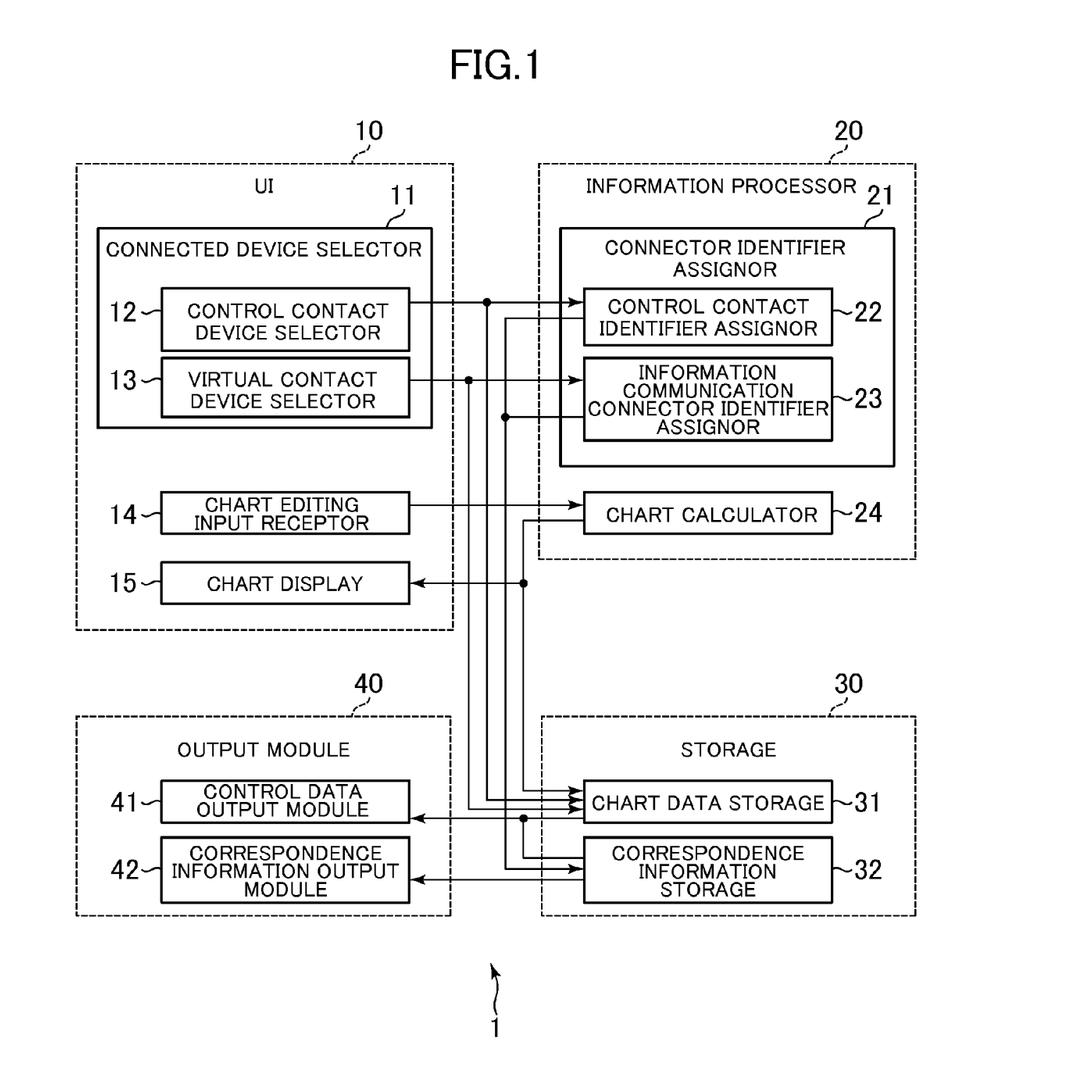
FIG. 1 is a functional block diagram of a machine control program generation device according to one embodiment of the present invention.

FIG. 1 is a functional block diagram of a machine control program generation device 1 according to the embodiment of the present invention. The machine control program generation device 1 illustrated in FIG. 1 includes a personal computer or other computers including a main unit mainly constituted by a CPU, a monitor such as a flat panel display, and various input devices such as a keyboard and a pointing device such as a mouse and a touch panel, and a program executed thereon. Respective functional blocks illustrated in FIG. 1 are realized by executing the program. The program may be stored in a computer-readable information storage medium such as various magneto-optical discs and semiconductor memories, and may be installed from the medium to the computer. Alternatively, the program may be downloaded via various information communication networks such as the Internet on the computer.

The machine control program generation device 1 is a device for supporting a user to generate a machine control program executed on a controller in a machine control system where the controller executing the machine control program controls machine components connected to the controller to realize functions as a whole.

As used herein, the controller refers to a device for realizing intended functions of the machine control system including the controller and physical elements connected to the controller by controlling the physical elements connected to the controller, and corresponds to a so-called programmable logic controller (PLC), a personal computer executing an arbitrary control program, or the like. Moreover, the machine component refers to a physical element realizing its function by being connected to and controlled by the controller, and the machine component does not always accompany a mechanical operation. Moreover, the machine component is not limited by whether the machine component includes electrical inputs/outputs. The machine component includes actuators such as various electric motors and solenoids, switches, sensors, and lamps. Further, the machine control program refers to information used by the controller to control the physical elements (namely, the machine components) connected to the controller to realize the intended functions as a whole. The machine control program includes a so-called ladder program that is generally used for the PLC, various control programs, and a time chart for describing operations of the respective machine components.

The machine control program generation device 1 includes, when roughly divided in terms of function, a user interface (UI) 10, an information processor 20, a storage 30, and an output module 40.

The UI 10 is physically a module for displaying appropriate information to a user and receiving an input from the user by using a graphical user interface (GUI) displayed on a monitor and various input devices, and according to this embodiment, includes a connected device selector 11, a control contact device selector 12, a virtual contact device selector 13, a chart editing input receptor 14, and a chart display 15. Moreover, the control contact device selector 12 and the virtual contact device selector 13 are included in the connected device selector 11.

The information processor 20 is physically a processor such as a CPU, and is a portion functionally representing information processing carried out internally on the processor. According to this embodiment, the information processor 20 includes a connector identifier assignor 21, a control contact identifier assignor 22, an information communication connector identifier assignor 23, and a chart calculator 24. Moreover, the control contact identifier assignor 22 and the information communication connector identifier assignor 23 are included in the connector identifier assignor 21.

The storage 30 is physically an information storage device such as a semiconductor memory and a hard disk drive (HDD), and a portion for storing information generated by the machine control program generation device 1. The storage 30 includes a chart data storage 31 and a correspondence information storage 32.

The output module 40 physically includes a processor and an appropriate input/output (I/O) port, and is a portion for outputting information generated by the machine control program generation device 1 to external devices. The output module 40 carries out conversion processing depending on necessity by using the processor to provide outputs from the I/O port to the external devices. The output module 40 includes a control data output module 41 and a correspondence information output module 42.

A description is now given of terms used in FIG. 1. As used herein, a connected device refers to a device connected to the controller, and includes a control contact device, an I/O unit, and a virtual contact device described later. Moreover, a connector refers to an electrical contact for connecting the controller and a connected device to each other, and includes a control contact and an information communication connector described later.

A control contact refers to a contact for inputting/outputting information depending on whether the contact has a state of a high impedance or a low impedance, and a control contact device refers to a device connected to the controller via the control contact. The control contact device includes various machine components such as a switch (so-called A contact and B contact) and a lamp.

The information communication connector is a connector for transferring coded information based on a certain communication protocol. The information transmission scheme is not particularly limited, and may be serial or parallel. The information communication connector is distinguished from the control contact in such a point that information transmitted via the control contact is not coded.

A virtual contact refers to a virtual control contact which does not physically exist but is treated as if the contact existed on the machine control program, and a virtual contact device refers to a device which is actually connected via the information communication connector to the controller but is controlled by inputs/outputs to/from a virtual contact on the machine control program. The virtual contact device includes a servo controller connected via MECHATROLINK (trademark) or the like, as well as a stepping motor, an inverter, and a touch panel.

The connector identifier is an identifier for the controller to identify each connector or an individual device connected to the connector, and includes a control contact identifier and an information communication connector identifier described later. The control contact identifier is an identifier for the controller to identify an individual control contact, and is, for example, a number of a control contact. The information communication connector identifier is an identifier for the controller to identify a device connected to the information communication connector. Note that, the information communication connector identifier does not always correspond one-to-one to an information communication connector physically included in the controller. As an example, even in a case where a plurality of connected devices are connected to one information communication connector in the so-called cascade connection configuration or star connection configuration, information communication connector identifiers different from one another are assigned to the respective connected devices to distinguish the connected devices. Further, an identifier for the controller to distinguish the virtual contact is referred to as virtual contact identifier, which is not illustrated in FIG. 1.

Moreover, correspondence information is information representing a correspondence between a connected device and a connector, and is physically information representing which connected device is connected to which connector of the controller or an I/O unit described later.

The machine control program generation device 1 according to this embodiment is a device for generating time charts as an example of the machine control program. On this occasion, in order to promote understanding, referring to FIGS. 2 and 3, a machine control system controlled by the time charts which are the machine control program generated by the machine control program generation device 1, and the time charts are exemplified.

Figure 2:
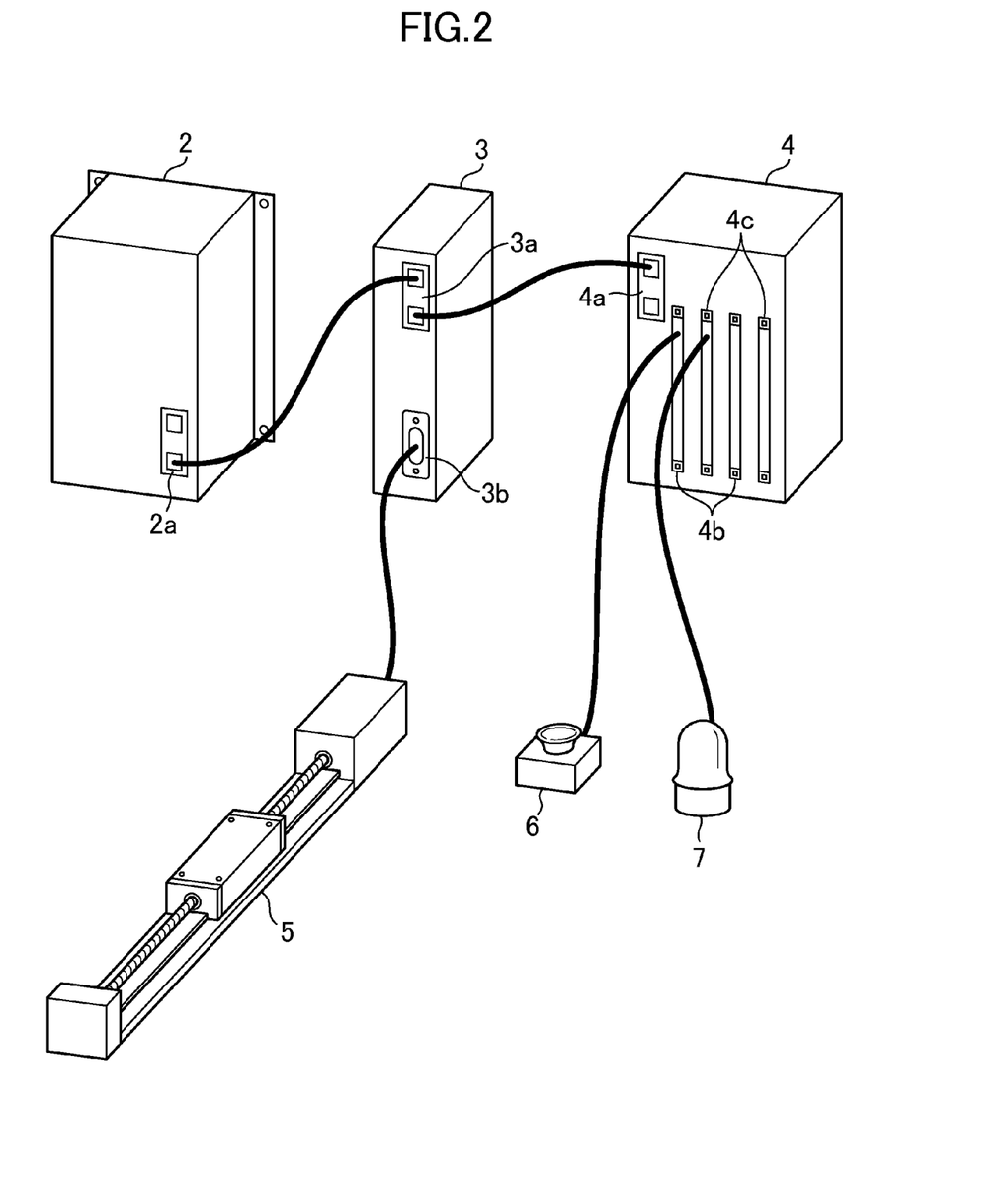
FIG. 2 is a schematic view illustrating an example of a machine control system.

FIG. 2 is a schematic diagram illustrating an example of the machine control system. In FIG. 2, the machine control system including a controller 2, a servo controller 3, an I/O unit 4, a linear slider 5, a switch 6, and a lamp 7 is illustrated as an example. The controller 2 is a machine for controlling the entire machine control system, and includes an information communication connector 2a. The servo controller 3 is a controller constituted by integrating a servo amplifier for controlling a servomotor and a control circuit therefor, and includes an information communication connector 3a for connecting to other devices such as the controller 2 and a servo connector 3b for connecting to a servo mechanism such as the linear slider 5. Further, the I/O unit 4 is a device including an information communication connector 4a for connecting to other devices such as the controller 2, and a large number of control contacts for connecting to control contact devices. The I/O unit 4 includes an input connector 4b and an output connector 4c as the control contacts, and the connectors 4b and 4c respectively include a large number of input control contacts and output control contacts. The I/O unit 4 transmits states of the control contacts input from the input connectors 4b via the information communication connector 4a to the controller 2 and controls states of the control contacts output from the output connectors 4c in response to commands similarly transmitted via the information communication connector 4a from the controller 2, and functionally serves to provide the controller 2 with additional external control contacts. The controller 2, the servo controller 3, and the I/O unit 4 can communicate with one another by connecting the information communication connectors 2a, 3a, and 4a with cables in the cascade connection.

To the servo connector 3b of the servo controller 3, the linear slider 5 is connected. The linear slider 5 is a mechanism constituted by integrating a servomotor, an encoder, a ball screw coupled to an output shaft of the servomotor, and a slide table that is guided by a linear guide and is driven by the ball screw, and the slide table is driven in response to an output from the servo controller 3. To the input connector 4b of the I/O unit 4, the switch 6 is connected, and to the output connector 4c, the lamp 7 is connected. Note that, the switch 6 is a normally-open type (namely, A contact type) mechanical switch.

Note that, in the above description and FIG. 2, other detailed configurations and wires which are not necessary for the description of this embodiment such as connections of power supply lines and ground lines are omitted for the sake of simple description and illustration.

Figure 3:
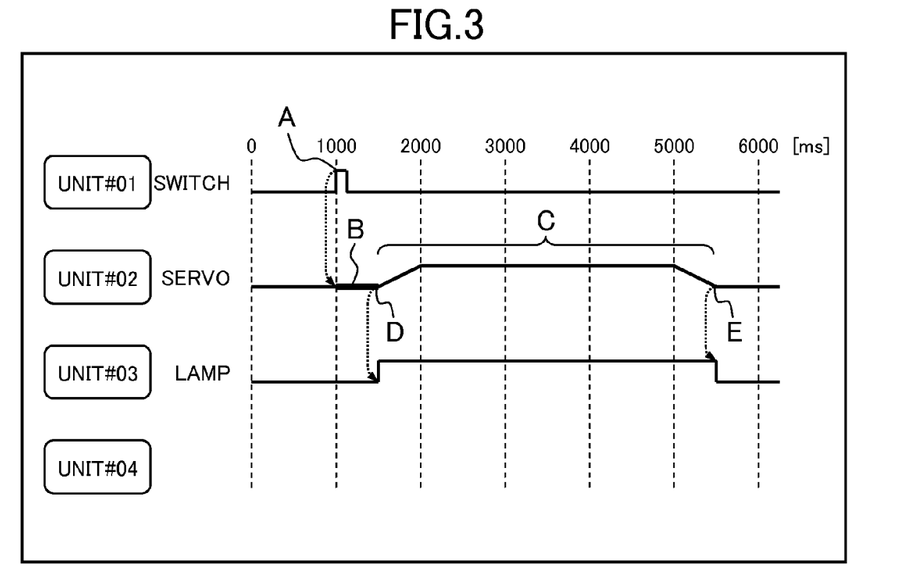
FIG. 3 is a diagram illustrating exemplified time charts representing control carried out by the machine control system of FIG. 2.

FIG. 3 is a diagram illustrating exemplified time charts representing control carried out by the machine control system of FIG. 2. FIG. 3 illustrates a simplified image that is generated by the machine control program generation device 1 according to this embodiment and is displayed on a monitor by the chart display 15 (refer to FIG. 1).

In the time charts, an individual number is assigned to each of the machine components connected to the controller 2 and, for example, for the switch illustrated at the uppermost position of FIG. 3, a number thereof is illustrated as "UNIT#01". On the right side of the number of the machine component, a type of the machine component is displayed as "SWITCH", for example. Further, on the right side of the type of the machine component, an individual time chart having a time axis as a horizontal axis is illustrated. The individual time chart illustrates, if the machine component is the control contact device, whether the control contact is in a state of a high/low impedance, if the machine component is a servo controller, a state of a servo such as a speed profile and a position profile (in FIG. 3, a speed profile of the slide table of the linear slider 5), and further, if the machine component is another virtual contact device, an appropriate state for controlling the machine. Out of the time charts illustrated in FIG. 3, "SWITCH" on the top row represents the switch 6 of FIG. 2, "SERVO" on the middle row represents the servo controller 3 of FIG. 2, and "LAMP" on the bottom row represents the lamp 7 of FIG. 2. Then, control carried out based on the time charts illustrated in FIG. 3 is to wait for 500 milliseconds (thick line B in FIG. 3) when the switch 6 is depressed (point A in FIG. 3), to move the linear slider 5 by using the servo controller 3 by a predetermined movement amount (C in FIG. 3), to turn on the lamp 7 when the linear slider 5 starts moving (point D in FIG. 3), and to turn off the lamp 7 when the linear slider 5 stops (point E in FIG. 3), thereby keeping the lamp 7 to be turned on while the linear slider 5 is moving.

Note that, in FIG. 3, each of the arrows represented by a broken line indicates that a change in state of a specific machine component is a start condition of a change in state of another machine component. For example, an arrow represented by a broken line extending from the point A in FIG. 3 indicates that a timer for 500 milliseconds represented by B in FIG. 3 is activated by depressing the switch 6.

Taking the machine control system and the time charts described above as an example, a description is now given of a sequence and an operation of generating time charts by the machine control program generation device 1. Note that, the configuration of each of the modules of the machine control program generation device 1 in the following description appropriately refers to FIG. 1.

Figure 4:
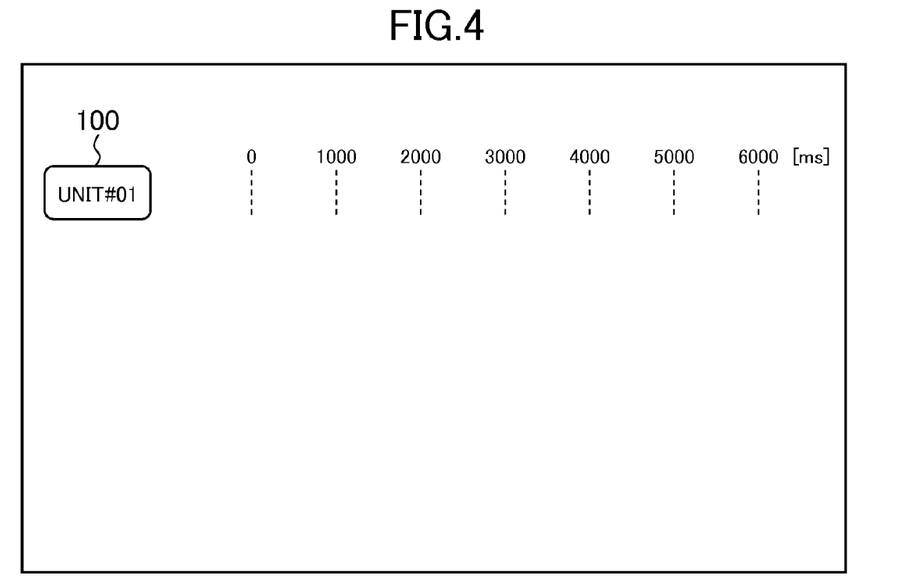
FIG. 4 is a diagram illustrating an image displayed by a chart display module in an initial state.

In the machine control program generation device 1, no time chart is generated in an initial state. Therefore, the chart data storage 31 for storing information representing generated time charts stores no information, and an image displayed by the chart display 15 for displaying the time charts on the monitor or the like is an image illustrated in FIG. 4, and the machine components and the individual time charts are not displayed. In this state, it is first considered to add the switch 6 of FIG. 2. The addition is carried out by appropriately operating the input device, and, as an example, may be carried out by pointing a number of a machine component denoted by reference numeral 100 and then selecting a type of a machine component to be added.

Depending on whether the machine component to be selected is a control contact device or a virtual contact device, a subsequent operation changes more or less, and the control contact device selector 12 and the virtual contact device selector 13 carry out the processing on the control contact device and the virtual contact device, respectively. On this occasion, the switch is the control contact device, and the control contact device selector 12 thus receives an operation by the user, and carries out the subsequent processing.

The control contact device selector 12 adds the switch to the time chart when the switch, which is the control contact device, is selected, and stores the time chart in the time chart storage module 31. Simultaneously, the control contact device selector 12 notifies the control contact identifier assignor 22 of the selection of the control contact device.

The control contact identifier assignor 22 assigns a new control contact identifier to the control contact device selected by the control contact device selector 12, and stores a correspondence between the control contact device and the assigned control contact identifier in the correspondence information storage 32 as correspondence information. On this occasion, the "new" control contact identifier means an identifier for a control contact which is not assigned to a control contact device and is thus available, out of the control contacts which can be recognized by the controller 2.

This operation is now described by way of the above-mentioned specific example. The control contact identifier assignor 22 is notified of the selection of the switch by the control contact device selector 12, and searches for an available control contact on the input side out of the control contacts. As appreciated from FIG. 2, though the controller 2 assumed in this embodiment includes the information communication connector 2a, the controller 2 does not directly have a control contact. Therefore, at this stage, there is no control contact which can be recognized by the controller 2. Thus, the control contact identifier assignor 22 assigns a new information communication connector identifier to a new I/O unit. Note that, in the controller 2, the information communication connector identifiers representing the I/O units and the information communication connector identifiers representing the servo controller and other virtual contact devices are distinguished from each other by different serial numbers. At this stage, an information communication connector identifier to which the I/O unit is assigned does not exist, and "IOST#01", which is the smallest information communication connector identifier, is thus newly assigned to the I/O unit. On this occasion, the I/O unit (the same type as the I/O unit 4 illustrated in FIG. 2) has, for example, a total of 40 control contacts including 20 control contacts on the input side, and 20 control contacts on the output side, and the assignment enables the controller 2 to recognize the 40 control contacts.

Then, the control contact identifier assignor 22 assigns the switch to a new control contact identifier. The switch is to be connected to the control contact on the input side, and hence this assignment is carried out so as to assign, out of available control contact identifiers corresponding to control contacts on the input side, the smallest control contact identifier. On this occasion, the control contact identifier is associated with the information communication connector identifier corresponding to the I/O unit including the control contact, and for example, such serial numbers as "IOST#01-01" to "IOST#01-40" are assigned. "IOST#01-01" to "IOST#01-20" correspond to the input-side control contacts, and "IOST#01-21" to "IOST#01-40" correspond to the output-side control contacts. Thus, though the switch is assumed to be assigned to "IOST#01-01" unless a particular situation arises, the switch is assigned to "IOST#01-04" in this case. This is because, on the I/O unit which is added to the controller 2 for the first time, some of the control contacts are reserved for specific applications. Then, reserved control contact identifiers corresponding to the reserved control contacts are already assigned to control contact devices when the I/O unit is added, and the control contact identifier assignor 22 cannot thus assign the switch to the reserved control contact identifiers. Note that, reserved control contact identifiers assumed on this occasion are "IOST#01-01" for a start input, "IOST#01-02" for a reset input, and "IOST#01-03" for a stop input, and "IOST#01-21" for an operation state output, "IOST#01-22" for a reset state output, and "IOST#01-23" for a stop state output.

In this way, by assigning, in advance, the reserved control contact identifiers reserved for the specific applications, the connection positions of the control contacts commonly used in various control systems are made common, connection operations are made easy, and readability of a machine control program increases.

After the above-mentioned assignment, the control contact identifier assignor 22 stores the correspondence between the I/O unit and the information communication connector identifier and the correspondence between the control contact device and the control contact identifier in the correspondence information storage module 32.

Figure 5:
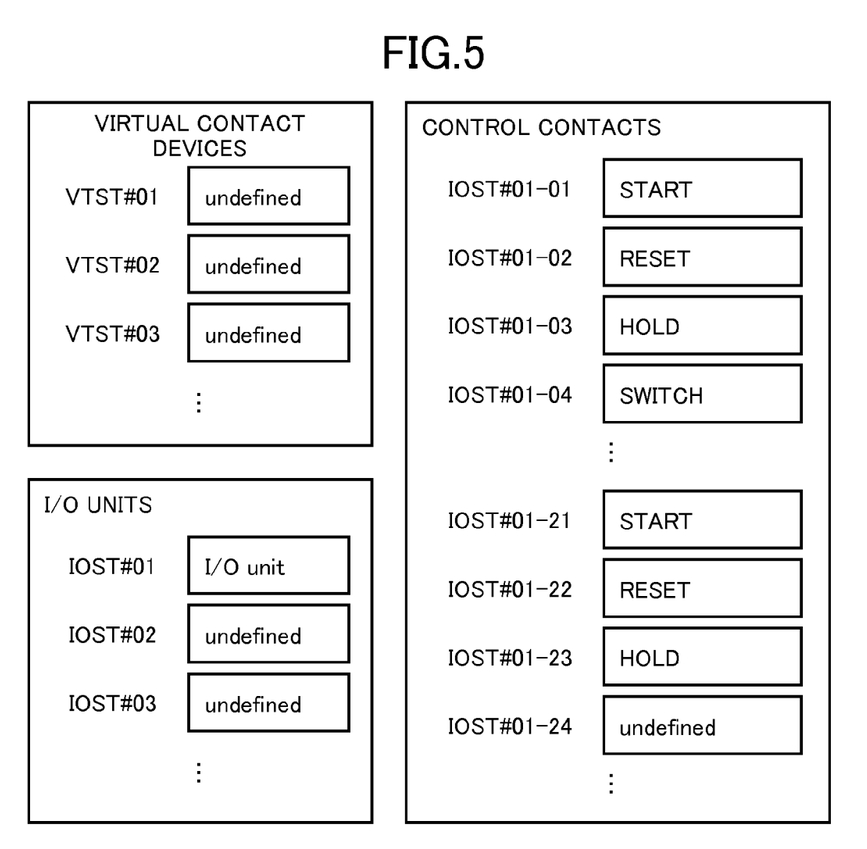
FIG. 5 is a diagram illustrating correspondence information while a time chart is being generated.

FIG. 5 is a diagram illustrating the correspondence information on this occasion. In FIG. 5, no device is assigned to information communication connector identifiers for virtual contact devices, and hence all of the information communication connector identifiers are undefined ("undefined"), and for I/O units, the I/O unit 4 is assigned to the information communication connector identifier "IOST#01". Moreover, for control contacts, in addition to the reserved control contact identifiers "IOST#01-01" to "IOST#01-03" and "IOST#01-21" to "IOST#01-23", the switch 6 is assigned to "IOST#01-04".

Figure 6:
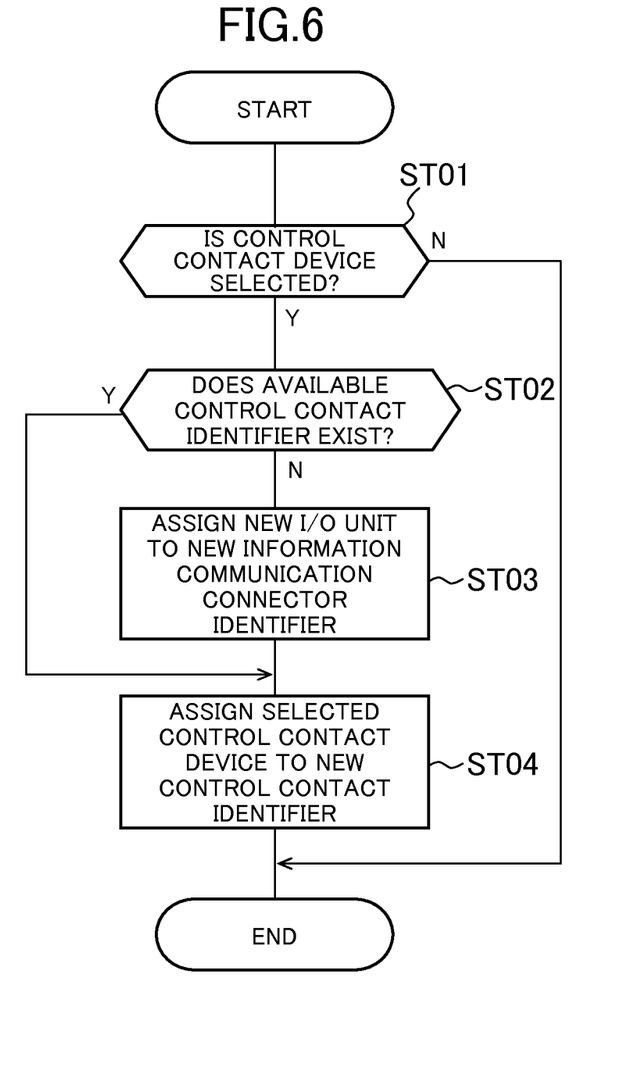
FIG. 6 is a flowchart illustrating an operation of a control contact identifier assignor.

The above-mentioned operation of the control contact identifier assignor 22 is illustrated as a flowchart of FIG. 6. In other words, in Step ST01, the control contact identifier assignor 22 determines whether or not a control contact device is selected, and when a control contact device is selected by the control contact device selector 12, the processing proceeds to Step ST02, and otherwise, the control contact identifier assignor 22 finishes the processing. In Step ST02, the control contact identifier assignor 22 determines whether or not an available control contact identifier exists, and when an available control contact identifier does not exist, the processing proceeds to Step ST03, and otherwise the processing proceeds to Step ST04. In Step ST03, the control contact identifier assignor 22 assigns a new I/O unit to a new information communication connector identifier, and the processing proceeds to Step ST04. In Step ST04, the control contact identifier assignor 22 assigns the selected control contact device to a new control contact identifier, and finishes the processing.

Figure 7:
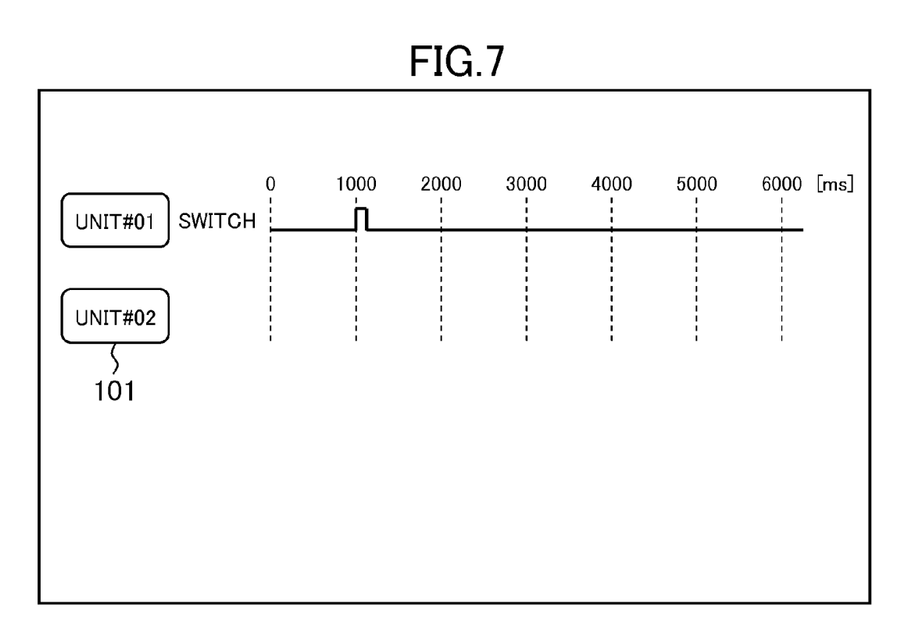
FIG. 7 is a diagram illustrating an image displayed by the chart display module in a state where a time chart of a switch is edited.

FIG. 7 illustrates a state where a time chart for the switch is edited based on operations of the user received by the chart editing input receptor 14. The editing of the time chart is carried out by, for example, specifying an appropriate point on a screen by using an appropriate pointing device. The chart calculator 24 calculates a form of each of the time charts based on inputs from the user. In the editing of the time chart for the switch 6, only a rising and a falling of a signal are specified, and hence the chart calculator 24 does not perform processing particularly. Information representing the time chart generated by the chart editing input receptor 14 and the chart calculator 24 is displayed on the monitor or the like as illustrated in FIG. 7 by the chart display 15, and is also stored in the chart data storage 31.

Then, the servo controller 3 illustrated in FIG. 2 is added. Also in this case, similarly, the servo controller 3 is added by pointing a number 101 representing a machine component and selecting the servo controller 3. On this occasion, the servo controller 3 is a virtual contact device, and the virtual contact device selector 13 thus receives an operation by the user, and carries out the subsequent processing.

The virtual contact device selector 13 adds, when the servo controller 3 which is the virtual contact device is selected, the servo controller 3 to the time chart, and stores the time chart in the chart data storage module 31 to which the servo controller 3 is added. Simultaneously, the virtual contact device selector 13 notifies the information communication connector identifier assignor 23 of the selection of the virtual contact device.

The information connector identifier assignor 23 assigns a new information communication connector identifier to the virtual contact device selected by the virtual contact device selector 13, and stores a correspondence between the virtual control contact device and the assigned information communication connector identifier in the correspondence information storage module 32 as correspondence information. In this case, an information communication connector identifier to which a virtual contact device is assigned does not exist, and "VTIO#01" which is the smallest information communication connector identifier is thus assigned to the servo controller 3.

Further, the information communication connector identifier assignor 23 assigns a virtual contact identifier required to control the virtual contact device associated with the assigned information communication connector identifier. In this case, respectively to the virtual contact identifiers "VTIO#01-01" to "VTIO#01-05", a servo-on, a sequential operation command, a forward rotation signal, a reverse rotation signal, and an origin return signal are assigned. Of course, these virtual contacts are examples, and may be different depending on a virtual contact device to be connected.

In this way, an operation of adding a virtual contact each time while referring to specifications of virtual contact devices added by the user is no longer necessary, and a labor for the operation of adding the virtual contact device is greatly reduced.

Figure 8:
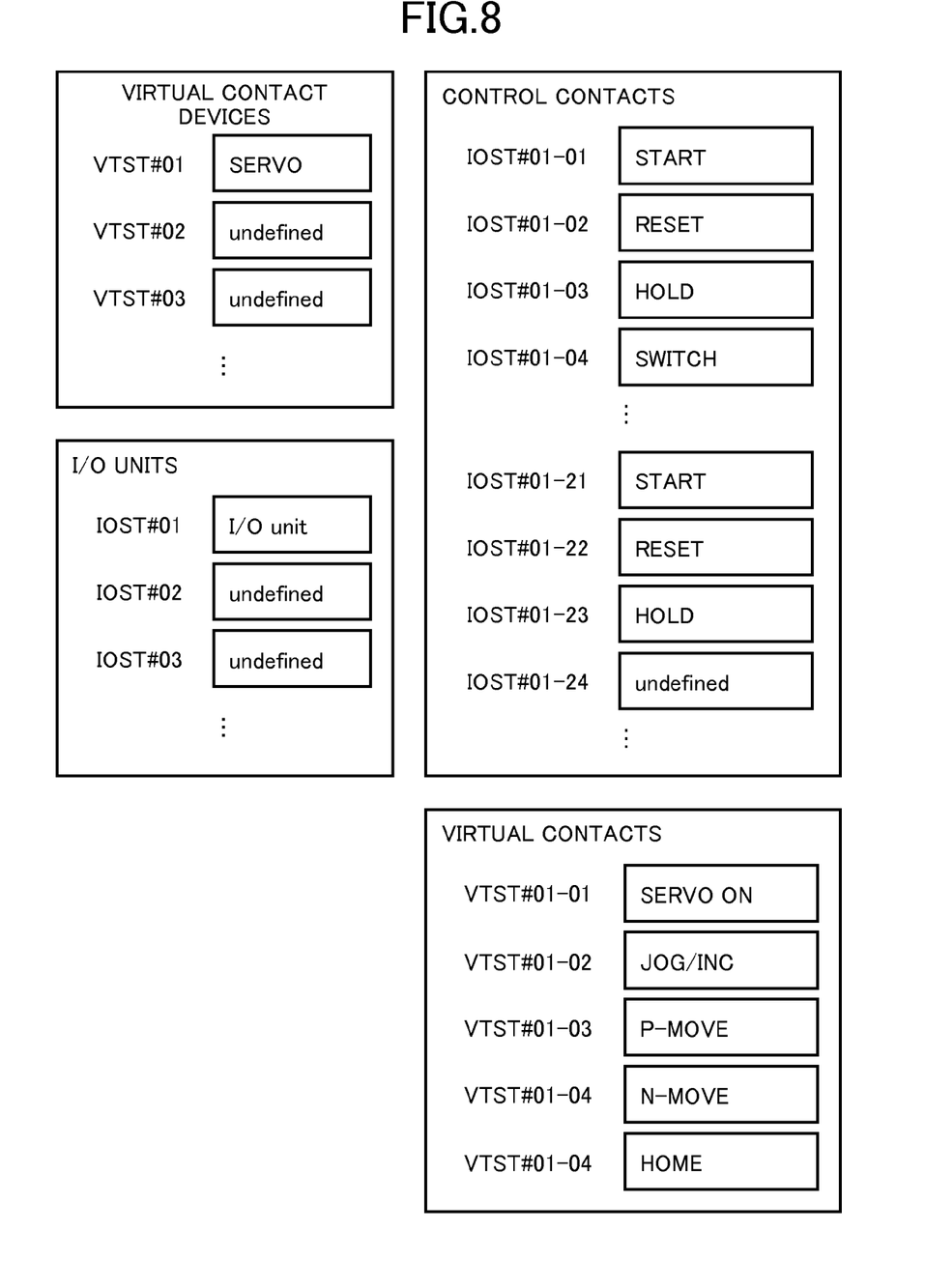
FIG. 8 is a diagram representing the correspondence information while time charts are being generated.

FIG. 8 is a diagram illustrating the correspondence information on this occasion. In FIG. 8, to the information communication connector identifier "VTIO#01" for a virtual contact device, the servo controller 3 (in FIG. 8, represented as "SERVO") is assigned. Moreover, to the virtual contact identifiers "VTIO#01-01" to "VTIO#01-04", which are virtual contact identifiers, virtual contacts are respectively assigned.

Figure 9:
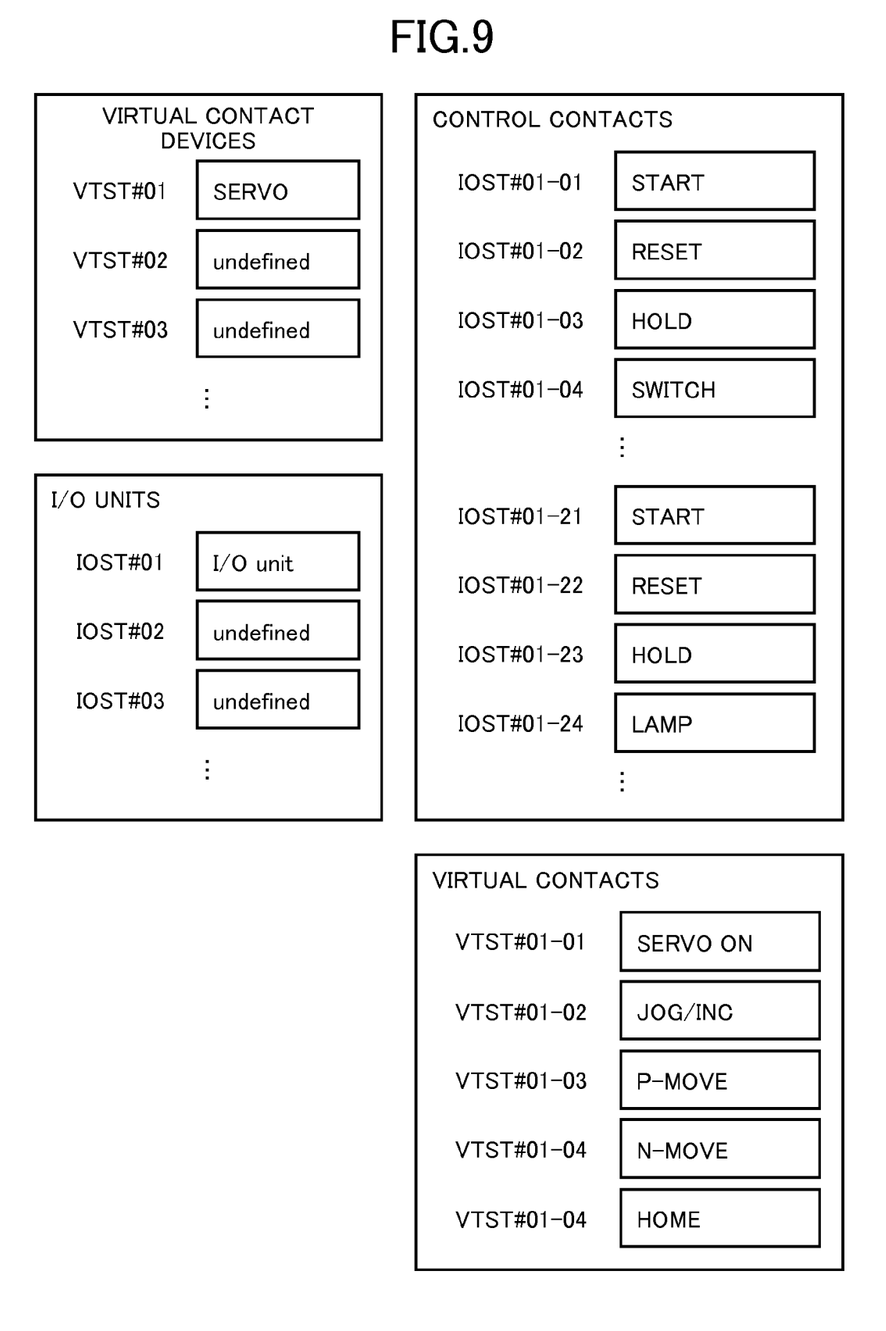
FIG. 9 is a diagram representing the correspondence information after the time charts are generated.

Further, the time chart illustrated in FIG. 3 is acquired by the chart editing input receptor 14 editing a time chart of the servo controller 3, by the control contact device selector 12 adding the lamp 7 of FIG. 2, and by the chart editing input receptor 14 editing the time chart. Note that, when the time chart of the servo controller 3 is edited, the chart calculator 24 calculates a waveform of the time chart depending on necessity, and stores the waveform in the chart data storage module 31. For example, based on information on an acceleration, the maximum speed, and the like specified in advance depending on an input movement amount of the slide table, the waveform indicated by C in FIG. 3 is calculated. Then, final correspondence information is acquired as illustrated in FIG. 9. In addition to the content illustrated in FIG. 8, the lamp 7 is assigned to a control contact identifier "IOST#01-24".

A portion common to the operations of the control contact device selector 12 and the virtual contact device selector 13 as described above is such a point that the connected device is selected. Thus, the connected device selector 11 is considered as a portion for selecting a connected device. Moreover, a portion common to the operations of the control contact identifier assignor 22 and the information communication connector identifier assignor 23 is such a point that a new connector identifier is assigned to a selected connected device. Thus, the connector identifier assignor 21 is considered as a module for assigning a new connector identifier to the selected connected device.

Note that, in the operation up to this point, the machine control program generation device 1 does not need to be physically connected to the controller 2, and the machine control program generation device 1 can solely generate a machine control program, on this occasion, time charts. Moreover, on this occasion, a correspondence between the connector identifier recognized by the controller 2 and a device actually connected to the controller 2 does not need to be defined in advance, and the correspondence is automatically generated by the machine control program generation device 1. Then, the correspondences are not assigned at once after the machine control program is completed, but are assigned each time the connected device is added. The method has such an advantage that when the machine control program is corrected or changed in the course of operation, the user does not need to update the connection between the connected device and the controller 2 which are already connected with each other. In other words, the method of assigning the correspondences at once after the machine control program is completed assigns again the correspondences when the machine control program is changed, resulting in a change in the existing correspondences, which requires the user to carry out the wiring operation again. In contrast, in the method according to this embodiment, a correspondence is newly added only for an added connected device, and it is thus only necessary to add a connection for the device to be added to the existing connections, which enables a great reduction in labor of the user.

Moreover, regarding the I/O unit, if a control contact needs to be added when a control contact device is added, an I/O unit is automatically added, and hence the necessity to add the I/O unit and a correspondence between the added I/O unit and a device to be connected do not need to be defined in advance.

Then, the generated time chart and correspondence are converted by the control data output module 41 into a form which can be carried out by the controller 2, and are output. The form is not particularly limited, and, for example, a ladder program is conceivable. Moreover, the output of the information from the control data output module 41 to the controller 2 may be in a wired or wireless manner.

Further, the correspondence information output module 42 outputs the correspondence information stored in the correspondence information storage module 32 in a form comprehensible to a user. For example, the correspondence information output module 42 causes an external printer to print the correspondence information in a form illustrated in FIG. 9. In this way, the user can appreciate to which connectors of the controller 2 the respective devices are to be connected, and can thus easily carry out the wiring operation matching the generated time chart. Note that, the output from the correspondence information output module 42 is not limited to the print on paper, and may be various forms such as display on an arbitrary monitor, transmission to another computer, and transmission as an electronic file to an external information storage device.

The above-mentioned embodiment is an example for embodying the present invention, and the present invention is not limited to the embodiment. In other words, the configuration of the machine control system, and the configurations of the time chart and the respective connectors and connector identifiers can be appropriately changed so as to satisfy the specifications. For example, the information communication connector identifiers representing virtual contact devices and the information connector identifiers representing I/O units may not be individual sets of serial numbers, and may be common serial numbers. Moreover, though the exemplified controller does not include control contacts, the controller may have control contacts. Further, a device controlled by the servo controller is not limited to the linear slider, and may be any device as long as the device is driven by a servomotor.

It should be understood by those skilled in the art that various modifications, combinations, sub-combinations and alterations may occur depending on design requirements and other factors insofar as they are within the scope of the appended claims or the equivalents thereof.

What is claimed is:

1. A machine control program generation device for generating a machine control program to be executed on a controller, said machine control program generation device comprising:

a connected device selector configured to select a connected device to be connected to the controller;

a connector identifier assignor configured to assign, when the connected device selector selects the connected device, a new connector identifier identifying a connector configured to connect the controller to the selected connected device; and a chart editing input receptor configured to edit the machine control program for the connected device based on operations of a user, wherein:

the connected device selector comprises a virtual contact device selector configured to select a virtual contact device to be connected to the controller via an information communication connector; and the connector identifier assignor comprises an information communication connector identifier assignor configured to:

assign, when the virtual contact device is selected, a new information communication connector identifier identifying the information communication connector to the selected virtual contact device, and assign a virtual contact identifier identifying a virtual control contact to the selected virtual contact device and the assigned new information communication connector identifier, the virtual control contact being configured to control the selected virtual contact device.

2. The machine control program generation device according to claim 1, wherein:

the connected device selector further comprises a control contact device selector configured to select a control contact device to be connected to the controller via a control contact; and the connector identifier assignor further comprises a control contact identifier assignor configured to assign, when the control contact device is selected, a new control contact identifier identifying the control contact to the selected control contact device.

3. The machine control program generation device according to claim 2, wherein:

the control contact identifier is associated with an information communication connector identifier identifying an information communication connector configured to connect an I/O unit to the controller; and the control contact identifier assignor assigns, when the control contact device is selected and when there is no available control contact identifier from a limited number of available control contact identifiers to be assigned for the I/O unit, a new I/O unit to a new information communication connector identifier, and assigns the selected control contact device to the new control contact identifier associated with the information communication connector identifier.

4. The machine control program generation device according to claim 2, wherein:

the control contact identifier includes a reserved control contact identifier which is reserved in advance for a specific application; and the control contact identifier assignor avoids assigning, when the control contact device is selected, the selected control contact device to the reserved control contact identifier.

5. The machine control program generation device according to claim 1, wherein the virtual contact device comprises at least any of a servomotor controller, a stepping motor controller, an inverter, and a touch panel.

6. The machine control program generation device according to claim 1, further comprising a correspondence information output module configured to output correspondence information representing the selected connected device and the assigned connector identifier corresponding thereto.

7. A machine control program generation method for generating a machine control program to be executed on a controller, said machine control program generation method comprising:

selecting a connected device to be connected to the controller;

assigning, when the connected device is selected, a new connector identifier identifying a connector configured to connect the controller to the selected connected device; and editing the machine control program for the connected device based on operations of a user, wherein:

the selecting of the connected device includes selecting a virtual contact device to be connected to the controller via an information communication connector; and the assigning of the new connector identifier includes:

assigning, when the virtual contact device is selected, a new information communication connector identifier identifying the information communication connector to the selected virtual contact device, and assigning a virtual contact identifier identifying a virtual control contact to the selected virtual contact device and the assigned new information communication connector identifier, the virtual control contact being configured to control the selected virtual contact device.

8. A tangible computer-readable information storage medium having stored thereon a program for causing a computer to function as a machine control program generation device for generating a machine control program to be executed on a controller, the machine control program generation device comprising:

a connected device selector configured to select a connected device to be connected to the controller;

a connector identifier assignor configured to assign, when the connected device selector selects the connected device, a new connector identifier identifying a connector configured to connecting the controller to the selected connected device; and a chart editing input receptor configured to edit the machine control program for the connected device based on operations of a user, wherein the connected device selector comprises a virtual contact device selector configured to select a virtual contact device to be connected to the controller via an information communication connector; and the connector identifier assignor comprises an information communication connector identifier assignor configured to:

assign, when the virtual contact device is selected, a new information communication connector identifier identifying the information communication connector to the selected virtual contact device, and assign a virtual contact identifier identifying a virtual control contact to the selected virtual contact device and the assigned new information communication connector identifier, the virtual control contact being configured to control the selected virtual contact device.

* * * * *